United States Patent [19]

Ital et al.

[11] 3,972,187
[45] Aug. 3, 1976

[54] HYDRAULIC TRANSMISSION

[75] Inventors: Günter Ital; Hans-Jürgen Fricke, both of Stuttgart; Paul Bosch, Ludwigsburg, all of Germany

[73] Assignee: Robert Bosch G.m.b.H., Stuttgart, Germany

[22] Filed: Sept. 25, 1974

[21] Appl. No.: 509,340

[30] Foreign Application Priority Data

Sept. 26, 1973 Germany............................ 2348389

[52] U.S. Cl.................................. 60/428; 60/445; 60/465; 60/486
[51] Int. Cl.² ........................................ F15B 13/09
[58] Field of Search ............ 60/428, 429, 430, 486, 60/445, 465, 479

[56] References Cited
UNITED STATES PATENTS 3,734,225  5/1973  Kobald et al. .................... 60/445 X
3,846,982  11/1974  Rometsch et al. .................... 60/445
3,859,790  1/1975  Bacquie et al. .................... 60/428

*Primary Examiner*—Edgar W. Geoghegan
*Attorney, Agent, or Firm*—Michael J. Striker

[57] ABSTRACT

A first pump and a second pump have respective mechanical inputs and are operative when the mechanical inputs are driven at constant speed for pumping fluid at an adjustable volumetric flow rate and at a constant non-adjustable volumetric flow rate, respectively, the maximum volumetric flow rate of the first pump being at least as great as that of the second pump. Connecting conduits connect the first pump in hydraulic circuit with an hydraulic consumer. An adjusting mechanism is provided for adjusting the volumetric flow rate of the first pump. A control arrangement is provided for bringing the second pump into and out of hydraulic circuit with the consumer in dependence upon the operation of the adjusting mechanism.

10 Claims, 4 Drawing Figures

HYDRAULIC TRANSMISSION

BACKGROUND OF THE INVENTION

The invention relates to an hydraulic transmission with at least two pumps supplying pressure medium to at least one hydraulic motor, with at least one of the at least two pumps furnishing fluid to the hydraulic motor only intermittently, when the fluid-furnishing demand reaches a value which cannot be met by the other pump or pumps.

In a known hydraulic transmission for driving the wheels of a vehicle, there are provided two constant-output pumps, i.e., two pumps which when their mechanical inputs are driven at constant speed furnish fluid at a constant non-adjustable volumetric flow rate. One pump furnishes fluid to an hydraulic motor which drives the vehicle wheels; the other furnishes fluid to another consumer. If this other consumer is not to be operated, then the second pump can be connected in circuit with the hydraulic motor which drives the vehicle wheels, so that such hydraulic motor is driven by the two pumps jointly, when a higher vehicle speed is desired.

Such an arrangement has the disadvantage that when the second pump is brought into circuit with the hydraulic motor there occurs a sudden jolt-like acceleration of the vehicle. In addition, the use of constant-volumetric-flow-rate pumps does not make it possible to drive the hydraulic motor which drives the vehicle wheels in an optimal manner.

It is known to provide an hydraulic transmission with an adjustable-volumetric-flow-rate pump, i.e., a pump which when its mechanical input is driven at constant speed can nevertheless be adjusted to furnish fluid at different volumetric flow rates. In particular, it is known to provide a hydraulic transmission with a single pump, and this an adjustable-volumetric-flow-rate pump, to overcome some of the disadvantages just mentioned. However, the cost of an adjustable-volumetric-flow-rate pump large enough to constitute the sole pump for an hydraulic transmission in a vehicle is great, making the cost of the transmission very high.

SUMMARY OF THE INVENTION

It is an object of the invention to provide an hydraulic transmission which overcomes the disadvantages enumerated above, but in a manner simpler and more economical than possible with prior-art expedients.

More particularly it is an object of the invention to provide an hydraulic transmission particularly suitable for use in an automotive vehicle.

It is a further object of the invention to provide an hydraulic transmission which can be driven in an optimal manner, relative to the hydraulic consumer and/or relative to the motor or engine driving the transmission pumps.

It is another object of the invention to provide an hydraulic transmission which operates in a jolt-free manner.

These objects, and others which will become more understandable from the description, below, of specific embodiments, can be met, according to one advantageous concept of the invention, by providing the hydraulic transmission with a first pump which can furnish fluid at an adjustable volumetric flow rate, i.e., whose volumetric flow rate can be adjusted even when the mechanical input of the pump is being driven at constant speed, with this first pump always supplying fluid to the hydraulic motor, so long as the transmission is in operation. A second pump is provided in the form of a constant-volumetric-flow-rate pump and is brought into hydraulic circuit with the hydraulic motor only when the capacity of the first pump is insufficient for a particular need. The first pump is provided with an adjusting member for adjusting the volumetric flow rate of the fluid furnished by the first pump. This adjusting member activates a switching means which brings the second pump into or out of the hydraulic circuit of the hydraulic motor in dependence upon the setting of the adjusting member of the first pump. The maximum volumetric flow rate of the first pump is at least as large as that of the second pump.

In this way it becomes possible to make the adjustable-volumetric-flow-rate pump of relatively small dimensions and accordingly of inexpensive construction. The constant-volumetric-flow-rate pump can be a very simple pump, such as a gear pump of simple construction, which likewise will be relatively inexpensive. The second pump will be brought into the hydraulic circuit of the hydraulic motor only when the rotary speed of the hydraulic-motor output shaft rises into higher ranges, and furthermore is brought into circuit in such a manner as to avoid jolts and sudden sharp accelerations. Because the first pump is an adjustable-volumetric-flow-rate pump its operation can be optimally controlled during low-speed operation, making the operation of the transmission in this range optimally efficient and economical.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
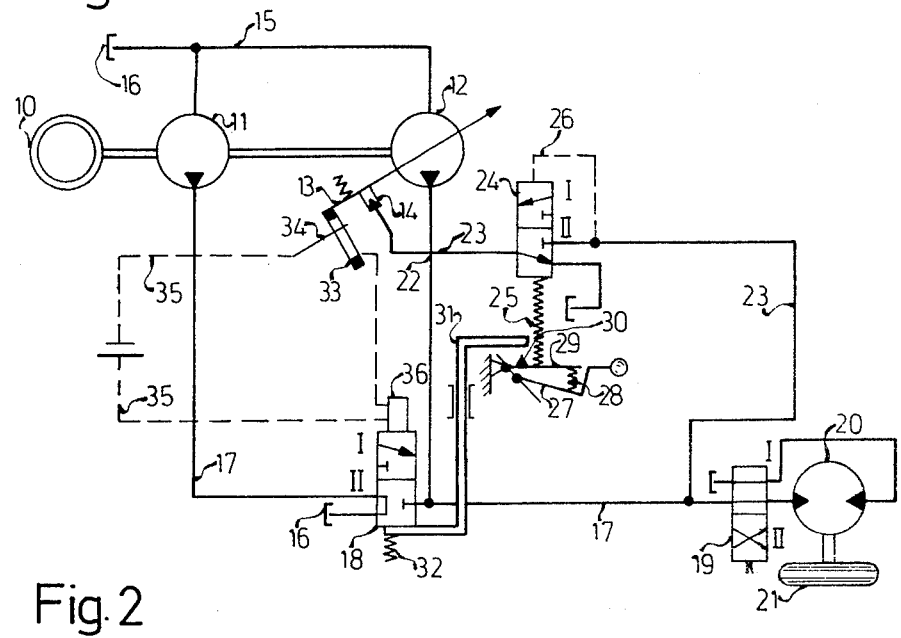
FIGS. 1–4 depict four different embodiments of the invention.

The embodiment of FIG. 1 will be discussed first.

A motor 10 drives two pumps 11, 12. The pump 11 is a constant-output pump, i.e., a pump which furnishes fluid at a constant volumetric flow rate, such as a simple gear pump. The pump 12 is an adjustable or variable-output pump, such as a radial piston pump. The two pumps can be designed to operate in tandem. The variable-output pump 12 has a schematically depicted adjusting member 13, the position of which is controlled by means of a pressure-fluid-energized positioning device 14, for example a differential-piston positioning device. Changing the position of the adjusting member 13 causes a change in the volumetric flow rate of the pump from zero to a maximum value. A suction conduit 15 connects the inlets of both pumps to a pressure fluid reservoir 16. A conduit 17 connects the outlet of pump 11 to an inlet port of a three-port two-position electromagnet-controlled valve 18. The two positions of valve 18 are designated I and II. The conduit 17 furthermore connects an outlet port of valve 18 to an inlet port of a valve 19, an outlet port of which is connected to an hydraulic motor 20 operative, for example, for driving a vehicle wheel 21. The valve 19 is a four-port two-position valve, the positions of which are designated I and II. Valve 19 serves for reversing the direction of flow of hydraulic fluid through the hydraulic motor 20.

A conduit 22 is connected at one end to the outlet of variable-output pump 12 and at its other end discharges into the conduit 17, downstream of the outlet port of valve 18. A conduit 23 branches off from the conduit 17 and leads to a pressure regulating valve 24, here a three-port two-position valve, having positions designated I and II. The valve member(s) of valve 24 are biased in one direction by a compression spring 25, when the latter is compressed, and biased in the opposite direction by the force of pressurized fluid in a control conduit 26 which branches off from the conduit 23. The point at which the conduit 23 branches off from the conduit 17 is upstream of the valve 19.

The spring 25 is supported on a pivoted lever member 29 which in turn is supported, by means of a compression-spring coupling 28 on a pivoted control lever 27. An abutment member 30 is provided on the lever member 29. The abutment member 30 cooperates with a control rod 31 which when activated acts upon the electromagnet-controlled valve 18, in a manner described below. The control rod 31 is normally pressed against the (non-illustrated) valve member(s) of valve 18 by means of a spring 32.

Provided on the adjusting member 13 of the variable-output pump 12 is a part 33 of a switch arrangement 33, 34. The moving part 33 of the switch arrangement 33, 34 cooperates with the stationary part 34 thereof. The stationary part 34 of the switch arrangement is electrically connected by means of conductors 35 with the control electromagnet of the valve 18. When the moving part 33 comes into electrical engagement with the stationary part 34 of the switch arrangement 33, 34, the current path of the control electromagnet of valve 18 becomes energized, and valve 18 undergoes a transition from setting II to setting I.

When the motor 10 drives the pumps 11, 12, these pumps suck pressure fluid out of the reservoir 16 through the suction conduit 15 and discharge such pressure fluid into the respective outlet conduits 17, 22. So long as electromagnet-controlled valve 18 remains in position II, the pressure fluid discharged through the outlet of pump 11 is returned directly back into the tank or reservoir 16; this is the situation while the rotary speed of the hydraulic motor 20 is still low. In contrast, the pressure fluid discharged by pump 12 is conveyed via conduits 22, 17 and the valve 19 to the hydraulic motor 20, driving the latter. When valve 19 is in position I, the rotor of hydraulic motor 20 turns in one direction; when valve 19 is in position II, the rotor of hydraulic motor 20 turns in the opposite direction.

The pressure prevailing upstream of hydraulic motor 20 is transmitted, via conduit 23 and control conduit 26 to the pressure regulating valve 24. This valve serves to control the volumetric flow rate of the variable-output pump 12 in dependence upon pressure. The illustrated biasing spring which engages adjusting member 13 is operative for normally biasing member 13 towards the maximum setting. The positioning device 14, when it is supplied with pressure fluid, i.e., when valve 24 is in position I, opposes the force of the biasing spring and can move the adjusting member 13 clockwise towards the null position thereof. Moreover, if the positioning device 14 has moved the adjusting member 13 to the null position, and if valve 24 remains in position I, pressure fluid cannot leave the positioning device 14, and accordingly the adjusting member 13 will be hydraulically locked in the null position.

As will be clear from the drawing, the pressure in the control conduit 26 tends to move the valve 24 to position I, whereas the opposing pressure, if any, exerted by biasing spring 25 tends to move the valve 24 to position II. When the valve 24 assumes position II, if the adjusting member 13 is not already in the maximum pump displacement position, pressure fluid flows out of the positioning device 14 into the pressure fluid reservoir through valve 24, so that the positioning device 14 permits the illustrated biasing spring to turn the adjusting member 13 counterclockwise towards the maximum pump displacement position thereof.

So long as the compression spring 25 is not compressed, it exerts upon the valve member(s) of valve 24 no biasing force, and the valve 24 remains in position I, preventing the escape of pressure fluid from positioning device 14, and thereby keeping adjusting member 13 in the clockwise-most or null position. Accordingly, the hydraulic transmission is at zero pressure, and the volumetric flow rate of the variable-output pump 12 is zero.

To bring the vehicle into drive, the control lever 27 is pivoted counterclockwise from its null position to a position corresponding to the desired value for the pressure of the hydraulic fluid to be furnished to the motor 20. The counterclockwise pivoting of control lever 27 compresses spring 25, causing spring 25 to move the valve member(s) of valve 24 to the II position. As a result, pressure fluid in the positioning device 14 leaves the latter, and the illustrated biasing spring turns the adjusting member 13 counterclockwise out of the zero position, towards the maximum pump displacement position. As a result, the volumetric flow rate of the fluid pumped by pump 12 rises rapidly to a value corresponding to the position to which the control lever 27 has been moved. This pressure rise effects an acceleration of the hydraulic motor 20. Specifically, with valve 24 in position II, and accordingly pressure fluid leaving positioning device 14, the adjusting member 13 is moved towards the maximum pump displacement position until the pressure of fluid furnished to motor 20, i.e., the pressure in that portion of conduit 23 to the right of valve 24 in FIG. 1, and accordingly in control conduit 26, reaches a value corresponding to a hydraulic force somewhat greater than the biasing force exerted by compression spring 25; when this occurs, the spring 25 is overcome, the valve 24 returns to position I, and further flow of fluid out of positioning device 14 is prevented, thereby locking the adjusting member 13 into the corresponding position. Clearly, the greater the counterclockwise displacement of control lever 27, the greater the compression of spring 25, the greater the biasing force exerted by spring 25, and the greater must be the pressure exerted via control conduit 26 in order to return valve 24 to position I and thereby terminate the regulating operation.

In this embodiment, as should be clear, the driver of the vehicle, by means of the control lever 27, is able to select, in particular, the desired value for the pressure of the fluid furnished to motor 20, and accordingly the torque furnished by the motor 20.

It is assumed that the regulating action of the valve 24 upon the pump 12 is very rapid, so that there exists a very close correspondence between the selected and actual values of the pressure of fluid being supplied to motor 20. It is also assumed that, for the type of operation described above, the selected value of the pressure requires a volumetric flow rate below the maximum which can be furnished by pump 12 acting alone; i.e.; it is assumed that the additional pump 11 need not be brought into circuit with the motor 20.

The constant-output pump 11 is first brought into circuit with the hydraulic motor 20 when, with rising vehicle velocity, the volumetric flow rate of the pump 12 has reached a value somewhat smaller than the maximum volumetric flow rate which the pump 12 can achieve. When this condition is reached, the adjusting member 13 reaches a position such that the schematically depicted switch arrangement 33, 34 closes the current path of the electro-magnet of valve 18, causing valve 18 to assume setting I. As a result, the fluid discharged from the outlet of pump 11 is no longer directly returned to the reservoir 16, but is instead conveyed, via conduit 17, to the hydraulic motor 20.

As a result of the furnishing of this additional fluid from pump 11 to motor 20, the pressure in conduit 23 and in control conduit 26 rises very rapidly. This rapid pressure rise in the control conduit 26 overcomes the biasing force of spring 25, and returns valve 24 to position I. As a result, pressure fluid in conduit 23 flows into positioning device 14, causing adjusting member 13 to rapidly move towards the null position.

In the embodiment of FIG. 1, the volumetric flow rate of constant-output pump 11 is below the trigger value of the volumetric flow rate of the variable-output pump 12—i.e., is below that value of the volumetric flow rate of variable-output pump 12 at which the switch arrangement 33, 34 energizes the control electromagnet 36 of valve 18.

Accordingly, when valve 18 moves to position I and the adjusting member 13 moves back towards the null position, in the manner just described, the adjusting member 13 is necessarily stopped before it reaches the null position.

The schematically depicted switch arrangement 33, 34 is a self-locking switch arrangement. When the adjusting member 13 reaches the triggering position, the switch arrangement 33, 34 is activated, thereby closing the current path of electromagnet 36. Thereafter, if adjusting member 13 is moved out of the triggering position, due to self-locking action, the switch arrangement, 33, 34 keeps the electromagnet 36 activated, until the adjusting member 13 returns to the null position. The self-locking action of the switch arrangement 33, 34 can be mechanical and/or electromechanical. For example, use could be made of a simple self-locking relay connected in the current path of electromagnet 36. When the switch arrangement 33, 34 energizes electromagnet 36, it would simultaneously energize such self-locking relay, which would keep electromagnet 36 energized even after the adjustting member 13 leaves the triggering position thereby opening switch arrangement 33, 34. The self-locking relay could be provided with a conventional interruptor switch mechanically coupled to the adjusting member 13 and opening to deenergize the self-locking relay, and thereby the electromagnet 36, when the adjusting member 13 returns to the null or zero position.

It will be understood that, when the valve 18 moves to position I, the flow of fluid from pump 11 to motor 20 will not produce a sudden pressure build-up; instead, the pressure will be limited to and maintained at the value selected by the lever 27, by means of the regulatiing action afforded by the valve 24. As a result, the torque furnished by motor 20 during the switch-in of pump 11 does not change and the transition is a a smooth one, free of jerks and jolts. The vehicle can now be further accelerated, until the variable-output pump 12 is operating at maximum volumetric flow rate, together with the constant-output pump 11.

When both pumps 11, 12 are furnishing fluid to motor 20, if the pressure in conduits 23, 26 should rise due to a change in load torque of the vehicle, the valve 24 will control the positioning device 14 in such a manner as to cause the adjusting member 13 to move towards the zero position. If the zero position is actually reached, switch arrangement 33, 34 will reopen, deenergizing electromagnet 18. As a result, the outflow from pump 11 will again be shunted directly back to reservoir 16. The pressure in conduits 23, 26 will accordingly tend to decrease, this decrease being counteracted by the regulating action of the valve 24 and positioning device 14, so that the adjusting member 13 is moved away from the zero position in such a manner as to maintain the pressure in conduits 23, 26 at the selected value.

If the constant-volumetric-flow-rate pump 11 is a pump which cannot safely handle pressures above a predetermined limit value, when the control rod 31 and abutment 30 may be provided. When the valve 18 moves to position I, thereby connecting pump 11 in circuit, the control rod 31 is drawn downwards (as viewed in the drawing), thereby limiting the extent to which the control lever 27 can be pivoted counterclockwise, and accordingly limiting the largest working pressure which can be selected by lever 27. Specifically, if the control lever 27 is pushed to the maximum working pressure which can be safely handled by pump 11, the abutment 30 abuts against the control rod 30, thereby preventing further tilting of the control lever 27. This limiting can also be accomplished by hydraulic, electrical or other means.

Figure 2:
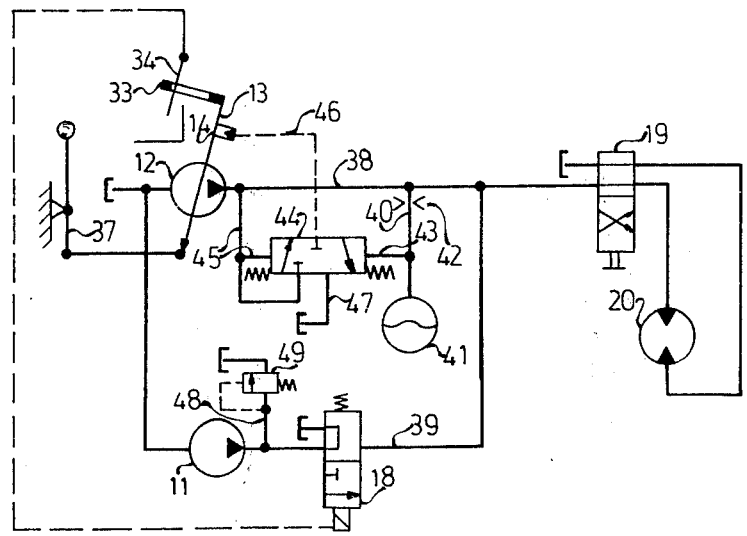

The embodiment of FIG. 2 differs from that of FIG. 1 essentially in that the volumetric flow rate of the continuously variable output pump 12 is controlled not in dependence upon the value of pressure selected by lever 27, but instead directly upon the position assumed by control lever 37. Components in FIG. 2 corresponding to those of FIG. 1 are designated by the same reference numerals.

A conduit 38 leads from the variable-output pump 12 via the valve 19 to the reversible hydraulic motor 20. A conduit 39 leads from the constant-volumetric-flow-rate pump 11 to the conduit 38, discharging into the latter upstream of the valve 19. A conduit 40 has one end connected to the conduit 38 upstream of valve 19 and another end connected to a pressure accumulator 41. The conduit 40 is provided with a flow restrictor 42. A valve 44 is controlled by the opposing pressures prevailing in the two associated control conduits 43, 45. The control conduit 43 communicates with the aforementioned conduit 40, whereas the control conduit 45 is connected directly to the pump outlet conduit 38. A conduit 46 connects the valve 44 to the positioning device 14 which positions the adjusting member 13 of the pump 12. The control conduit 45 is additionally connected to one port of the valve 44. A conduit 47 connects another port of the valve 44 to the fluid reservoir or tank. Oppositely acting biasing springs act upon the valve member(s) of valve 44, causing the latter to assume position(s) corresponding to the central position schematically depicted in FIG. 2. The electromagnet-controlled valve 18, corresponding to the valve 18 of FIG. 1, is connected in the pump outlet conduit 39 of the pump 11. A conduit 48 is connected at one end to the pump outlet conduit 39 of pump 11 and at the other end to a pressure-limiting valve 49.

If the selector lever 37 is moved to a position associated with a volumetric flow rate greater than a predetermined trigger value, then when the adjusting member 13 of pump 12 reaches a trigger position corresponding to the triggering value, the switch arrangement 33, 34 closes, thereby energizing the electromagnet of valve 18, and causing valve 18 to assume the non-illustrated position. As a result, the outflow from pump 11 is conveyed via valve 19 to the hydraulic motor 20. During the activation of the electromagnet-controlled valve 18, the pump 12 by means of the pressure-controlled valve 44 is so controlled that the pressure of the fluid supplied to the motor 20 and the pressure in the pressure accumulator 44 coincide. The pressure in the pressure accumulator, during this brief transition period, is maintained by means of the flow restrictor 42 at about the pressure which the motor-energizing fluid had just prior to the start of the transition. During the transitional connecting into circuit of the constant-output pump 11, the pressure in the accumulator 41, and accordingly also the pressure upstream of valve 19 controlled by pressure regulator 44, decrease only slightly, so that a jolt-free transition is achieved.

When the pump 11 is not connected in the motor supply circuit, the pressure accumulator 41 and the pressure-controlled valve 44 additionally serves to prevent undesired sudden increases and decreases in the pressure of the motor energizing fluid and sudden undesired accelerations and decelerations of the vehicle. In this situation, the valve 44 changes the volumetric flow rate of the pump 12 as soon as the pressure difference between the pressure accumulator 41 and the pump outlet conduit 38 exceeds a predetermined value; the change will be an increase or decrease, as appropriate. The output pressure of pump 11, after pump 11 has been connected into the motor supply circuit, can likewise be limited, either as in the embodiment of FIG. 1 (i.e., by blocking of valve 18 in dependence upon the output pressure of pump 12) or else by means of the pressure-limiting valve 49.

Figure 3:
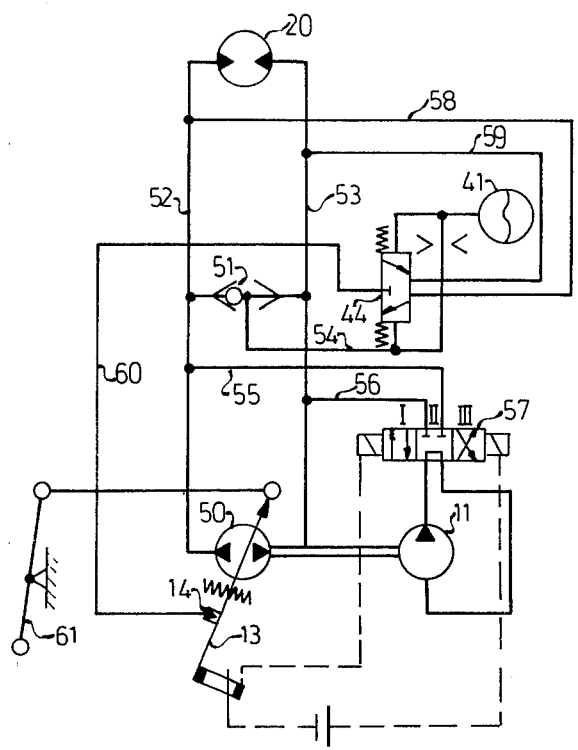

The embodiment of FIG. 3 corresponds to that of FIG. 2, but with the difference that the continuously variable-output pump, here identified by numeral 50, is a reversible pump. Accordingly, the reversing valve 19 used in the other embodiments for reversing the direction of reversible motor 20 can be eliminated. Instead, there is provided a changeover valve 51 which bleeds the flows of control fluid to the valves of the high pressure side. Continuously variable-output pump 50 and hydraulic motor 20 are connected with each other in a closed circuit by means of conduits 52, 53. The changeover value 51 is connected between the conduits 52, 53. A conduit 54 leads from changeover valve 51 to the pressure-controlled valve 44 and to the pressure accumulator 41. Additionally, conduits 55, 56 branch off the conduits 52, 53 and lead to an electromagnet-controlled valve 57. electromagnet-controlled valve 57 serves the same function as electromagnet-controlled valve 18 in the embodiments of FIGS. 1 and 2, but is here provided in the form of a four-port three-position valve having positions designated I, II, III. When the electromagnet-controlled valve 57 is in position I or in position III, the pump 11 can pump pressure medium to the corresponding high-pressure side of the motor 20; in the neutral position II, the valve 57 causes the outflow from pump 11 to be recirculated.

Conduits 58, 59 lead from the conduits 52, 53 to the pressure-controlled valve 44. A conduit 60 leads from the valve 14 to the positioning device 44 for the adjusting device 13 of the pump 50. Again a control lever, here a control lever 61, is employed for setting the position of the adjusting member. In this embodiment, the electromagnet-controlled valve 57 is activated when the volumetric-flow-rate of the pump 50 reaches predetermined minimum and maximum values.

Figure 4:
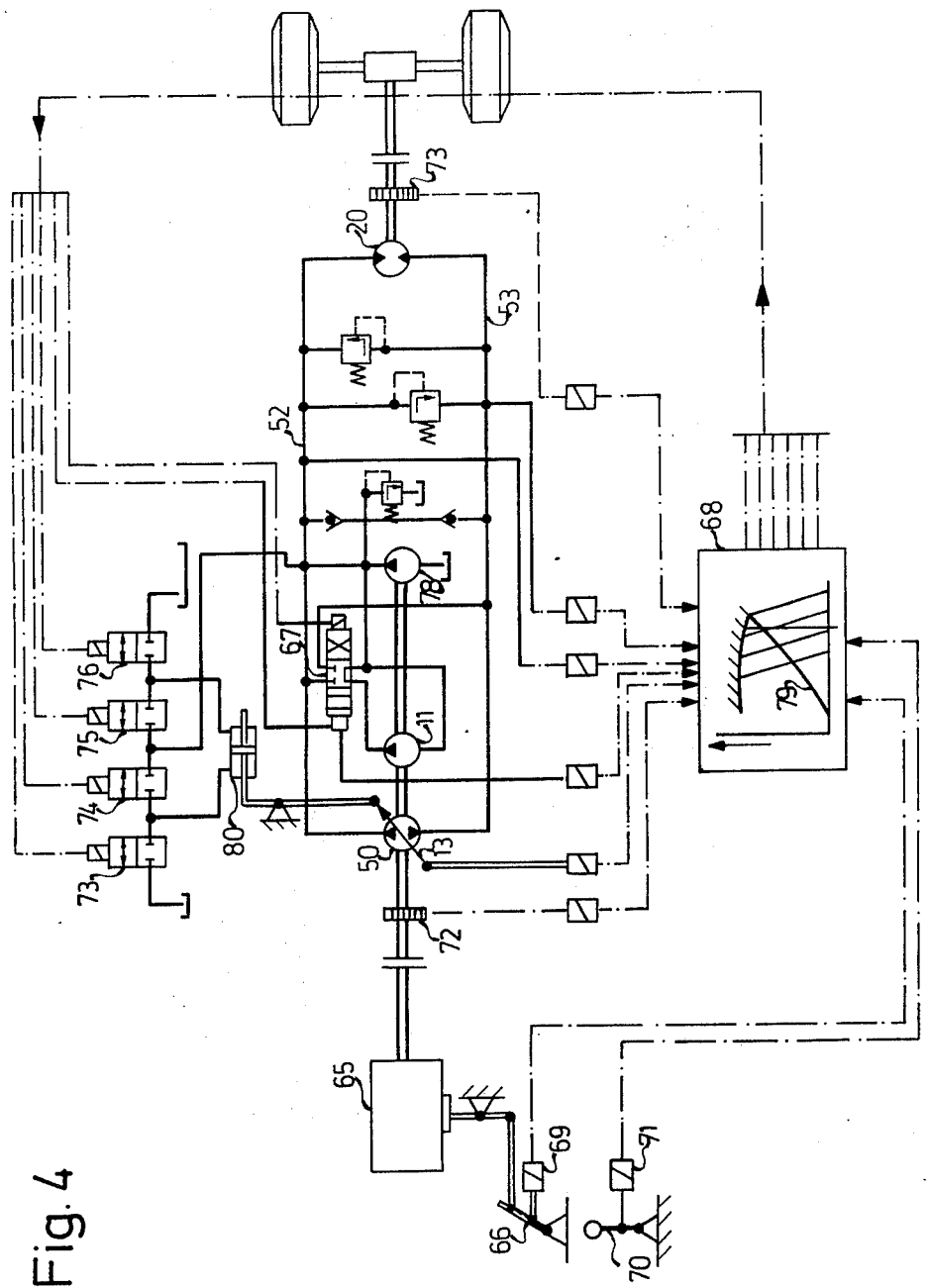

In the embodiment of FIG. 4 the pump and the hydraulic motor are likewise arranged in a closed circuit. The continuously variable-output pump again is identified by numeral 50 and the motor by numeral 20; the two are connected to each other by means of the conduits 52, 53. The pump 50 is driven by a diesel engine 65 which is controlled by means of a foot pedal 66. The control of the continuously variable-output pump and the connecting of the constant-output pump into the motor circuit by means of the electromagnetically operated valve 76, in this embodiment, occur under the control of an electronic control device 68.

The foot pedal 66 is provided with an electrical position transducer 69 which generates an electrical signal indicative of the angular displacement of the foot pedal 66 and which applies this signal to one input of the electronic control device 68. Also applied to various inputs of the electronic control device 68 are electrical signals derived from per se conventional transducers, indicative of the following: the rotary speed $n_1$ of the pump 50 as indicated by a tachometer 72; the rotary speed of the output shaft of the hydraulic motor 20 as indicated by a tachometer 73; the pressures $p_1$ and $p_2$ of the principal conduits 52, 53 of the transmission arrangement; the position of the adjusting member 13 of the pump 50; and the position of the electromagnet-controlled valve 67. For the purpose of cooling and to make up for leakage losses in the closed hydraulic circuit, there is additionally provided an auxiliary pump 78. The adjusting member 13 of the pump 50 is positioned by means of a servo cylinder 80 controlled by valves 73, 74, 75, 76.

With this arrangement the basic operation of the pumps and of the motor is the same as in the previously described embodiments. In particular, the constant-volumetric-flow-rate pump 11 is connected into the motor circuit or taken out of the motor circuit when the volumetric flow rate of the continuously variable-output pump 50 has reached respective predetermined maximum and minimum values. During the transitional movement of the valve member(s) of electromagnet-controlled valve 67, the electronic control device 68 serves to maintain constant the pressure of the fluid supplied to the motor 20, by controlling the volumetric flow rate of the pump 50.

Since the electronic control device 68 establishes an upper limit for the drive torque for the two pumps, indicated by the curve 79 on the graph shown in FIG. 4, it can be used to prevent impermissibly high pressure loading of the constant-output pump when the latter is connected in the hydraulic motor circuit. The connecting of the constant-output pump into the hydraulic motor circuit in a jolt-free manner can also be achieved when, during the movement of the valve member(s) of electromagnet-controlled valve 67, not the pressure of the motor-energizing fluid but instead the rotary speed of the hydraulic motor output shaft is to be maintained constant.

It is to be noted that in the graph shown in FIG. 4, the rotary speed of the diesel engine 65 is plotted along the horizontal, and the output torque along the vertical. It is desired that the diesel engine, for any particular speed, be called upon to develop the torque indicated by curve 79, since then the operation of the dieisel engine will be most efficient.

In all of the illustrated embodiments the constant-output pump and the continuously variable-output pump are connectable into circuit with a common consumer; the maximum volumetric flow rate of the continuously variable-output pump is equal to or greater than the volumetric flow rate of the constant-output pump; and the constant-output pump is brought into the consumer circuit when the variable-output pump is operating at approximately the maximum volumetric flow rate thereof. The constant-output pump can be a cheap and simple one, for example a gear pump of simple construction, and can be taken out of the consumer circuit when the volumetric flow rate of the variable-output pump is approximately zero. The hydraulic motor can be either a rotating motor or a linear motor. The invention is not limited to the provision of a hydraulic transmission for vehicles.

It will be understood that each of the elements described above, or two or more together, may also find a useful application in other types of hydraulic circuits and constructions differing from the types described above.

While the invention has been illustrated and described as embodied in a hydraulic transmission for a vehicle, it is not intended to be limited to the details shown, since various modifications and structural changes may be made without departing it in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In combination, an hydraulic consumer; a first pump and a second pump having respective mechanical inputs and operative when said mechanical inputs are driven at constant speed for pumping fluid at an adjustable volumetric flow rate and at a constant non-adjustable volumetric flow rate, respectively, the maximum volumetric flow rate of said first pump being at least as great as that of said second pump; connecting means connecting said first pump in hydraulic circuit with said consumer; adjusting means for adjusting the volumetric flow rate of said first pump; and control means operative for bringing said second pump into and out of hydraulic circuit with said consumer in dependence upon the operation of said adjusting means.

2. The combination defined in claim 1, wherein said adjusting means comprises an adjusting member movable between positions corresponding to minimum and maximum volumetric flow rates of said first pump, and wherein said control means comprises means for bringing said second pump into hydraulic circuit with said consumer when said adjusting member moves from a position corresponding to a lower volumetric flow rate to a predetermined actuating position corresponding to a predetermined higher volumetric flow rate.

3. The combination defined in claim 1, wherein said control means comprises means activatable by a human operator for selecting the pressure of the hydraulic fluid furnished to said consumer and means for maintaining the pressure of the fluid furnished to said consumer at the selected value by automatically controlling said adjusting means.

4. The combination defined in claim 2, wherein said control means comprises means activatable by a human operator for selecting the pressure of the hydraulic fluid furnished to said consumer and means for maintaining the pressure of the fluid furnished to said consumer at the selected value by automatically controlling said adjusting means.

5. The combination defined in claim 1, wherein said connecting means includes a valve arrangement having a first setting in which said valve arrangement connects said second pump in circuit with said hydraulic consumer and a second setting in which said valve arrangement takes said second pump out of circuit with said hydraulic consumer, said valve arrangement comprising a control winding, and wherein said control means includes an electrical switch arrangement connected in the current path of said control winding and activated by said adjusting means and operative for causing said valve arrangement to assume said first setting when said adjusting means assumes a setting corresponding to a preselected volumetric flow rate.

6. The combination defined in claim 1, wherein said control means comprises means activatable by a human operator for selecting the volumetric flow rate of the hydraulic fluid furnished to said consumer and means for maintaining the volumetric flow rate of the fluid furnished to said consumer at the selected value by automatically controlling said adjusting means and by automatically bring said second pump into and out of hydraulic circuit with said consumer in dependence upon the operation of said adjusting means.

7. The combination defined in claim 1, and further including a pressure accumulator and a flow restrictor connected between the outlet of said first pump and said pressure accumulator, and a pressure-controlled valve having a first control port connected to the outlet of said first pump and having a second control port connected intermediate said flow restrictor and said pressure accumulator and operative when said second pump is brought into circuit with said consumer for automatically keeping the pressure of fluid at the outlet of said first pump substantially equal to the pressure of fluid in said pressure accumulator by automatically controlling said adjusting means.

8. The combination defined in claim 1, wherein said first pump is a reversible pump.

9. The combination defined in claim 1, wherein said connecting means connects said first pump and said hydraulic consumer in a closed flow circuit and wherein said first pump is a reversible pump.

10. The combination defined in claim 1, further including drive means for driving said pumps, and wherein said control means comprises conduit means for connecting said second pump to said consumer and valve means in said conduit means actuatable for controlling the flow of fluid from said second pump to said consumer, and wherein said control means comprises means for generating signals respectively indicative of the desired volumetric flow rate or pressure of fluid furnished to said consumer, the desired speed and loading of said drive means, the position of said adjusting means, the fluid pressure in the hydraulic circuit of said consumer, the speed of operation of said consumer, and the setting of said valve means, and an electronic control circuit connected to said means for generating and operative for receiving said signals and in dependence thereon controlling said adjusting means and said valve means.

* * * * *